US009676516B2

(12) United States Patent
Doll

(10) Patent No.: US 9,676,516 B2
(45) Date of Patent: Jun. 13, 2017

(54) THERMOFORMED HOLLOW PLASTIC BODY AND METHOD FOR PRODUCING IT

(71) Applicant: Theo Doll, Schwaigern (DE)

(72) Inventor: Theo Doll, Schwaigern (DE)

(73) Assignee: DR. DOLL HOLDING GMBH, Schwaigern (DE)

( * ) Notice: Subject to any disclaimer, the term of this patent is extended or adjusted under 35 U.S.C. 154(b) by 809 days.

(21) Appl. No.: 14/057,547

(22) Filed: Oct. 18, 2013

(65) Prior Publication Data

US 2014/0113092 A1 Apr. 24, 2014

(30) Foreign Application Priority Data

Oct. 19, 2012 (DE) .................. 10 2012 219 149
Oct. 23, 2012 (DE) .................. 10 2012 219 358

(51) Int. Cl.
*B29C 51/16* (2006.01)
*B29C 47/00* (2006.01)
(Continued)

(52) U.S. Cl.
CPC ............ B65D 19/385 (2013.01); B29C 51/12 (2013.01); B29C 51/267 (2013.01);
(Continued)

(58) Field of Classification Search
CPC ......... B29C 65/02; B29C 65/48; B29C 66/50; B29C 66/51; B29C 66/54; B29C 66/541;
(Continued)

(56) References Cited

U.S. PATENT DOCUMENTS 3,873,654 A * 3/1975 Smith ..................... B29C 67/20
156/245
5,401,456 A * 3/1995 Alesi, Jr. ............... B29C 44/569
156/245
(Continued)

FOREIGN PATENT DOCUMENTS

DE 30 38 795 A1 5/1982
DE 36 12 775 A1 10/1987
(Continued)

OTHER PUBLICATIONS

European Search Report issued in Appln. No. 13189489.1 dated Mar. 3, 2014 with English translation of Category of Cited Documents (7 pages).
German Examination Report issued in German Application No. 10 2012 219 358.8 dated Aug. 28, 2013 (5 pages).

*Primary Examiner* — Philip Tucker
*Assistant Examiner* — Brian R Slawski
(74) *Attorney, Agent, or Firm* — Flynn, Thiel, Boutell & Tanis, P.C.

(57) ABSTRACT

A thermoformed hollow plastic body, which is formed by two plastic shells welded to one another around the periphery, with at least one hollow chamber, into which at least one dimensionally stable plastic body is placed, and a method for producing such a thermoformed hollow plastic body wherein a first sheet of plastic is thermoformed into a first plastic shell while forming at least one open hollow chamber.
The outer contour of the plastic body is made to match an inner contour of the hollow chamber and is connected by its surface in full area contact and with a material bond to neighboring inner surfaces of the plastic shells.

12 Claims, 5 Drawing Sheets

(51) Int. Cl.
| | |
|---|---|
| *B29C 65/00* | (2006.01) |
| *B32B 37/00* | (2006.01) |
| *C08J 5/00* | (2006.01) |
| *B65C 9/25* | (2006.01) |
| *C09J 5/00* | (2006.01) |
| *B29D 22/00* | (2006.01) |
| *B29D 23/00* | (2006.01) |
| *B32B 1/08* | (2006.01) |
| *B65D 39/00* | (2006.01) |
| *B65D 19/38* | (2006.01) |
| *B29C 51/12* | (2006.01) |
| *B29C 51/26* | (2006.01) |
| *B65D 19/00* | (2006.01) |
| *B65D 19/18* | (2006.01) |
| *B29C 65/02* | (2006.01) |
| *B29C 51/00* | (2006.01) |
| *B29C 49/20* | (2006.01) |
| *B29K 105/00* | (2006.01) |
| *B29L 31/00* | (2006.01) |
| *B29K 23/00* | (2006.01) |
| *B29K 55/02* | (2006.01) |
| *B29K 69/00* | (2006.01) |

(52) U.S. Cl.
CPC ......... *B65D 19/0028* (2013.01); *B65D 19/18* (2013.01); *B29C 49/20* (2013.01); *B29C 51/00* (2013.01); *B29C 65/02* (2013.01); *B29C 66/54* (2013.01); *B29K 2023/06* (2013.01); *B29K 2023/065* (2013.01); *B29K 2023/12* (2013.01); *B29K 2055/02* (2013.01); *B29K 2069/00* (2013.01); *B29K 2105/0097* (2013.01); *B29K 2623/12* (2013.01); *B29K 2625/06* (2013.01); *B29K 2715/003* (2013.01); *B29L 2031/7178* (2013.01); *B65D 2519/00034* (2013.01); *B65D 2519/00069* (2013.01); *B65D 2519/0091* (2013.01); *B65D 2519/00139* (2013.01); *B65D 2519/00174* (2013.01); *B65D 2519/00208* (2013.01); *B65D 2519/00273* (2013.01); *B65D 2519/00288* (2013.01); *B65D 2519/00323* (2013.01); *B65D 2519/00338* (2013.01); *B65D 2519/00437* (2013.01); *B65D 2519/00562* (2013.01); *B65D 2519/00592* (2013.01); *Y10T 428/1352* (2015.01); *Y10T 428/1376* (2015.01)

(58) Field of Classification Search
CPC ..... B29C 66/543; B29C 66/545; B29C 51/00; B29C 51/10; B29C 2791/006; B29C 49/20; B65D 2519/00034; B65D 2519/00273; B65D 2519/00462; B65D 2519/00562; Y10S 108/901
USPC ......... 156/60, 196, 210, 212, 242, 245, 292, 156/297, 298, 303.1, 308.2, 308.4, 309.6, 156/309.9, 322; 428/35.7, 36.5; 108/57.26, 57.27
See application file for complete search history.

(56) References Cited

U.S. PATENT DOCUMENTS

| | | | |
|---|---|---|---|
| 6,294,114 B1* | 9/2001 | Muirhead | B29C 51/165 156/292 |
| 6,705,853 B1 | 3/2004 | Nehring | |
| 2005/0237184 A1 | 10/2005 | Muirhead | |
| 2005/0263044 A1* | 12/2005 | Bearse | B29C 44/569 108/57.25 |
| 2006/0236903 A1* | 10/2006 | Moore, Jr. | B65D 19/001 108/57.25 |
| 2008/0146102 A1* | 6/2008 | Cheung | A63C 5/03 441/74 |
| 2008/0295748 A1* | 12/2008 | Yoshida | B65D 19/0026 108/55.1 |
| 2009/0029083 A1* | 1/2009 | Endo | B29C 49/20 428/36.5 |
| 2010/0043676 A1* | 2/2010 | Apps | B65D 19/004 108/53.3 |
| 2010/0186639 A1* | 7/2010 | Schiava | B29C 51/16 108/57.27 |
| 2011/0135862 A1 | 6/2011 | Sumi et al. | |

FOREIGN PATENT DOCUMENTS

| | | |
|---|---|---|
| DE | 101 51 629 A1 | 7/2002 |
| EP | 1 886 791 A1 | 2/2008 |
| EP | 2 591 909 A2 | 5/2013 |
| JP | 2002-96379 A | 4/2002 |
| WO | WO 2010/151106 A1 | 12/2010 |

* cited by examiner

THERMOFORMED HOLLOW PLASTIC BODY AND METHOD FOR PRODUCING IT

CROSS-REFERENCE TO RELATED APPLICATIONS

This claims priority from German Patent Application Nos. DE 10 2012 219 149.6 and DE 10 2012 219 358.8. The entire disclosures of these applications are hereby incorporated by reference into this application.

FIELD OF THE INVENTION

The invention relates to a thermoformed hollow plastic body in the form of a plastic pallet, which is formed by two plastic shells welded to one another around the periphery, with at least one hollow chamber, into which at least one dimensionally stable plastic body is placed, and relates to a method for producing such a thermoformed hollow plastic body, a first sheet of plastic being thermoformed into a first plastic shell while forming at least one open hollow chamber.

BACKGROUND OF THE INVENTION

A method for producing a thermoformed hollow body in the form of a plastic pallet is generally known as a twinsheet method. In this case, two sheets of plastic are simultaneously thermoformed in a corresponding mold into plastic shells that complement one another and are subsequently pressed together, whereby the welding of the two plastic shells is obtained at the contact points and in particular at a peripheral region. A corresponding thermoformed hollow plastic body forms a twinsheet component, which is used in particular as a pallet base of pallet containers that are used in the automobile industry for transporting and storing vehicle and engine parts.

SUMMARY OF THE INVENTION

The object of the invention is to provide a thermoformed hollow plastic body and a method for producing it that make improved insulation and increased stiffness possible for the hollow plastic body.

This object is achieved for the thermoformed hollow plastic body of the type mentioned at the beginning by the outer contour of the plastic body being made to match an inner contour of the hollow chamber and the plastic body being connected by its surface in full area contact and with a material bond to neighboring inner surfaces of the hollow chamber. The invention provides a dimensionally stable plastic body which is placed in the hollow chamber and brings about a stiffening of the hollow plastic body by the material-bonding connection to the inner surfaces of the hollow chamber. This is so because the outer contour of the plastic body is made to match an inner contour of the hollow chamber, meaning that the plastic body supports the two plastic shells from the inside. The connection of the plastic body to the inner surfaces of the plastic shells in full area contact and with a material bond has the effect of achieving a solid connection between the plastic body and the plastic shells, which ensures a high degree of stability when there is a deformation of the plastic shells. The material-bonding connection may take place thermally by welding between the surfaces of the plastic body and the inner surfaces of the plastic shells. Alternatively, the material-bonding connection may be achieved by a bonding layer, in particular a layer of adhesive. It is important for the solution according to the invention that the plastic materials of the plastic body on the one hand and the plastic shells on the other hand are made to match one another in such a way that thermoplastic welding takes place in the contact region between the plastic body and the plastic shells. The plastic body is designed as a foam plastic body or as an injection-molded plastic body. The foam plastic body forms a block body of one and the same material, preferably of EPP (expanded polypropylene) or EPS (expanded polystyrene). When EPS is used, it is advantageous to provide high-temperature resistant EPS.

The solution according to the invention is suitable in a particularly advantageous way for thermoformed, two-shell hollow plastic bodies that are designed as pallet bases, as feet for such pallet bases, as pallet covers and as pallet rings of pallet containers, which serve for transporting and storing parts for vehicle and engine construction. In the same way, the hollow plastic body according to the invention may be used for surfboards or similar sporting equipment.

In a refinement of the invention, the plastic body is provided with multiple clearances to save material. These clearances are already formed during the production of the foam plastic body by corresponding design of the mold with the aid of cores, pins or the like. The material saving of the expensive plastic foam has the effect that reduced material costs are obtained. Alternatively, they are subsequently introduced into a finished, block-form foam plastic body by machining.

For the method for producing a two-shell, thermoformed hollow plastic body of the type mentioned at the beginning, the object on which the invention is based is achieved by at least one dimensionally stable plastic body being provided with an outer contour that is made to match an inner contour of the hollow chamber and being inserted into the hollow chamber, and by a second sheet of plastic being provided and, by thermoforming to form the second plastic shell, being placed onto the first plastic shell and also the at least one plastic body and welded around the periphery to a peripheral region of the first plastic shell, and by the plastic body being connected at its surface in a material-bonding manner to neighboring inner contours of the two plastic shells. The material-bonding connection may advantageously take place by welding or by adhesive bonding.

In a refinement of the invention, the plastic body is designed as a foam plastic body or as an injection-molded plastic body.

In a further refinement of the method, before being inserted into the hollow chamber of the first plastic shell, the foam plastic body is produced with an oversize with respect to the hollow chamber and also with respect to a second hollow chamber, formed by the second plastic shell. It is ensured by this oversize that, when the second plastic shell is thermoformed and placed on the first plastic shell, the foam plastic body is subjected to external pressure, as a result of which together with the still hot plastic shells there is an incipient melting of the surfaces of the foam body, which leads to the welding to the inner surfaces of the two plastic shells in the region of the hollow chambers. The plastic shells may be designed identically to or differently from one another, depending on how the hollow plastic body to be produced is to be designed.

In a further refinement of the invention, the foam plastic body is welded to the inner contours of the two sheets of plastic. For this refinement, the sheets of plastic forming the plastic shells and the foam plastic body must consist of plastic materials that can be welded to one another. Particularly advantageously, the sheets of plastic consist of HDPE or else of PP, PE, or ABS or PC (polycarbonate) and the foam plastic body consists of EPP or EPS. In the case of a combination of the sheets of plastic of HDPE and the foam plastic body of EPP, it is easy to dispose of the hollow plastic body produced, since both the foam plastic body and the plastic shells are based on plastic materials with very similar material properties. As a result, easy recycling is made possible.

In a further refinement of the invention, the foam plastic body is inserted in the hot state of the first sheet of plastic thermoformed into the plastic shell. In a further refinement, the second sheet of plastic is thermoformed into the second plastic shell and placed in the hot state and under pressure onto the first plastic shell and the at least one foam plastic body and is welded both peripherally to the first plastic shell and in full area contact to the surface of the foam plastic body. The welding necessarily takes place due to the hot state of the plastic shell and the incipient melting of the foam plastic body in the region of the surfaces.

In a further refinement of the invention, the outer dimensions of the plastic body are made to match the inner dimensions of the hollow chamber bounded by the two plastic shells, and a surface of the plastic body is provided with a bonding layer, in particular a layer of adhesive, which after the joining together of the plastic shells forms the material-bonding connection to the inner contours of the plastic shells. In the case of this refinement, the material-bonding connection between the plastic body and the inner sides of the plastic shells preferably takes place by a layer of adhesive, the adhesive being applied to the plastic body and/or to the inner surfaces of the plastic shells in the region of the hollow chamber before the plastic body is inserted. The adhesive is preferably heat-activated, i.e. it gains its adhesive properties only when there is relatively great heat from about 60° C. At room temperature, although it is present as a layer on the plastic body, it does not have any adhesive effect. It is also possible to design the foam plastic body to be slightly larger in its outer dimensions than those dimensions of the hollow chamber between the two plastic shells and to connect the plastic shells to one another after the insertion of the foam plastic body, and thereby subject the foam plastic body to external pressure.

In a further refinement of the invention, at least the hollow chamber of the first plastic shell is cooled before the plastic body is inserted. It is also possible still before the placement of the second plastic shell additionally to cool also the hollow chamber of the second plastic shell, in order to avoid incipient melting of the plastic body in the region of its surfaces. This refinement is intended for a material-bonding connection by adhesive bonding between the plastic body and the plastic shells in a cooler state than the temperature of the other surfaces of the plastic shells.

In a further refinement of the invention, the foam plastic body is incipiently melted in the region of its outer contour before insertion into the hollow chamber to achieve a smooth surface. In this case, the foam plastic body is incipiently melted in the region of its surface before it is inserted into the hollow chamber of the first plastic shell. The formation of the smooth surface serves the purpose of subsequently achieving after application of a corresponding layer of adhesive a good connection in full area contact and with material bonding between the outer surfaces of the foam plastic body and the inner surfaces of the hollow chamber between the two plastic shells.

In a further refinement of the invention, before the application of the second plastic shell, a reinforcing profile arrangement, in particular a reinforcing frame, is inserted into the first plastic shell or into the plastic body. As the reinforcing profile arrangement, it is possible to provide instead of a closed frame also multiple reinforcing profiles that are spaced apart parallel to one another in the form of strips or the like, which are arranged in relation to corresponding feet of the plastic pallet in such a way that they bring about a distribution of the load among the corresponding feet. The reinforcing frame also extends over correspondingly arranged feet of the plastic pallet, in order to bring about the desired introduction of force from above. This reinforcing frame may be designed as a frame of metal tubes, in particular as a steel frame, and serves for reinforcing and stiffening the hollow plastic body, i.e. the plastic pallet. This refinement is particularly advantageous for the use of the hollow plastic body for a pallet base of a pallet container such as that described above.

Further advantages and features of the invention are provided by the claims and also by the description that follows of preferred exemplary embodiments of the invention, which are represented on the basis of the drawings.

DETAILED DESCRIPTION

Figure 1:
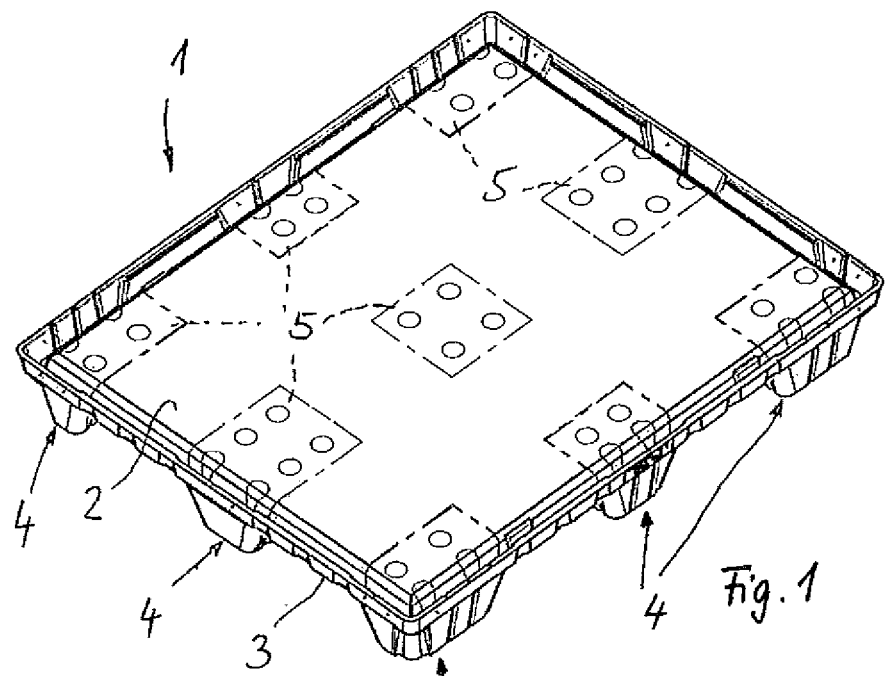
FIG. 1 shows an embodiment of a hollow plastic body according to the invention in the form of a plastic pallet in a perspective representation.

A plastic pallet 1 as shown in FIGS. 1 and 3 to 7 represents a two-shell, thermoformed hollow plastic body, which serves for pallet containers used for storing and transporting products intended for the automobile industry. The plastic pallet is subsequently referred to as a pallet base. Apart from the pallet base 1, such a pallet container has a folding wall ring, forming the container walls, and also a cover, which can be placed onto the folding wall ring as soon as the folding wall ring is in its state of being erected and inserted in a periphery of the pallet base 1. Apart from the pallet base 1, which is described in detail below, the folding wall ring is also made of plastic and designed as a two-shell plastic body. By analogy with the pallet base 1, the cover is also configured as a two-shell, thermoformed hollow plastic body. The production of the pallet base 1 as well as of the cover and the folding wall ring of the pallet container takes place in a twinsheet method, in that two sheets of plastic are thermoformed by means of molds correspondingly made to match the desired shell form and are welded to one another at the contact points by pressing together of the molds. In the case of all twinsheet products, the continuous welding takes place in the peripheral region, in order to achieve an outwardly sealed termination of the hollow chambers and hollow spaces formed between the two plastic shells.

The pallet base 1 as shown in FIGS. 1 and 3 to 7 consists of a first plastic shell 3, which in the case of the embodiment shown in FIGS. 1 and 3 to 7 forms the lower plastic shell. The pallet base 1 also comprises an upper plastic shell 2, which defines a substantially planar and continuously closed bottom surface for the pallet base 1. The upper plastic shell 2 is provided around the periphery with an indentation, which serves for receiving the inserted folding wall ring of the pallet container in its erected position.

The pallet base 1 is provided in the region of its underside with multiple supporting feet 4, which feet project downwardly from a base wall 4a (FIG. 3) of the pallet base 1 beyond a lower terminal surface 4b thereof, and which feet define the standing areas of the pallet base 1 on an underlying surface or on a cover of a further pallet container. The various supporting feet 4 are thus provided in the region of the underside of the pallet base 1 in such a way that a fork of a forklift truck can move under this pallet base 1 from all sides, in order to raise the pallet base 1 and the associated pallet container.

The lower plastic shell 3 is formed by thermoforming from a one-part sheet of plastic, which preferably consists of HDPE. The design of the plastic shell 3 from the sheet of plastic is obtained by thermoforming in a corresponding mold. This involves forming of the feet 4, which respectively define a hollow chamber 7 in the region of their inner side.

The upper, second plastic shell 2 is likewise formed from a sheet of plastic by simultaneous thermoforming in a mold that is located above the mold for the lower plastic shell 3. The upper plastic shell 2 is also produced from a planar sheet of plastic of HDPE. The welding of the upper plastic shell 2 to the lower plastic shell 3 takes place within the twinsheet mold by joining together of the hot molds. On account of the heat and on account of the pressure, the upper plastic shell 2 and the lower plastic shell 3 are welded to one another at the contact points, and in particular at the periphery of the two plastic shells 2, 3.

Before the joining together of the two plastic shells 2, 3, a foam plastic body 5, in the present case of EPP, is respectively inserted into the hollow chambers 7 in the region of the feet 4, the respective foam plastic body 5 having been produced in a dimensionally stable form in a previous operation. The respective foam plastic body 5 is inserted into the still hot plastic shell 3 within the corresponding thermoforming mold. The outer dimensions and outer contour of each foam plastic body 5 are made to match the inner contour and the inner dimensions of the hollow chamber 7 of each foot 4, the respective foam plastic body 5 having a small oversize with respect to the inner dimensions and the inner contour of the respective hollow chamber 7. The insertion into the still hot plastic shell 3 has the effect that the foam plastic body 5 begins to melt in the region of its surface and thereby enters into a material-bonding connection in the form of a welding to the neighboring inner walls of the lower plastic shell 3 in the region of the respective hollow chamber 7. Directly after the insertion of the foam plastic body 5, the likewise still hot plastic shell 2 is placed by means of the upper mold onto the lower plastic shell 3, the corresponding inner surfaces of the upper plastic shell 2 necessarily coming into connection in full area contact with the facing surfaces of the foam plastic bodies 5. The small oversize of the foam plastic bodies 5 has the effect that the upper plastic shell 2 is also pressed onto the corresponding outer surfaces of the foam plastic bodies 5 when the two plastic shells 3 are joined together. On account of the hot state of the upper plastic shell 2, incipient melting also takes place in the region of this contact area between the foam plastic body 5 and the upper plastic shell 2, and accordingly a connection in full area contact and with material bonding takes place in the region of the neighboring contact areas by welding.

As can be seen from the various figures of the pallet base 1, the foam plastic bodies 5 are provided with clearances 8, which serve for saving material of the respective foam plastic body 5. The clearances 8 are introduced during the production of the dimensionally stable foam plastic body 5 by means of corresponding cores or pins in the foam material.

After the joining together of the two plastic shells 2, 3 with prior insertion of the foam plastic bodies 5, the foam plastic bodies 5 completely fill the respective hollow spaces 7 between the two plastic shells 2, 3 and are connected substantially in full area contact and with material bonding to the facing contact areas of the inner sides of the two plastic shells 2, 3 by the welding. The solution according to the invention uses the hot state of the plastic shells 2, 3 within the corresponding molds to achieve the insertion of the foam plastic bodies 5 and the welding in the region of its surfaces to the inner walls of the plastic shells 2, 3. Additional heating or welding operations are not required.

In the case of the embodiment as shown in FIGS. 1 and 3 to 7, the plastic materials of the two plastic shells 2, 3 and the foam plastic bodies 5 are made to match one another in such a way that mutual weldability is ensured. The melting points of the materials of the foam plastic bodies on the one hand and the plastic shells 2, 3 on the other hand are also made to match one another in such a way that the foam plastic bodies 5 only begin to melt in the region of their surfaces when the two plastic shells 2, 3 are joined together, without otherwise losing their dimensionally stable form. In the joined-together and welded state according to FIGS. 4 and 5 and also 1, the foam plastic bodies 5 therefore completely fill the hollow spaces 7 and form a stable support for the two plastic shells 2, 3. The stability of the pallet base 1 is increased greatly as a result. Moreover, as a result, improved sound and heat insulation of the pallet bases 1, and consequently of the pallet containers as a whole, is achieved. Further parts of a corresponding pallet container, such as in particular a cover and a folding wall ring or else removable feet of a pallet base, can be produced in the same way as the pallet base 1 described above.

In the case of an exemplary embodiment of the invention that is not represented, the foam plastic bodies 5 and the plastic shells 2, 3 are produced from different plastic materials that cannot be welded to one another, or only with unsuitable parameters. In the case of such an embodiment, the material-bonding connection between the foam plastic bodies 5 and the plastic shells 2, 3 does not take place by welding, but rather by adhesive bonding in full area contact. For this purpose, after the thermoforming of the lower plastic shell 3, the hollow chambers 7 into which the foam plastic bodies 5 are inserted are cooled. The foam plastic bodies 5 and/or the inner surfaces of the hollow chamber 7 are coated with heat-activated adhesive. Subsequently, the foam plastic bodies 5 are inserted into the hollow chambers V. In a next method step, the upper plastic shell 2 is pressed by its corresponding mold in the same way onto the lower plastic shell 3, as described above on the basis of the embodiment as shown in FIGS. 1 and 3 to 7. The only difference is that the upper plastic shell 2 is also cooled to about 60° C. to 80° C. in the form of points or portions of the surface area in the regions of its inner side that come into contact with the surfaces of the foam plastic bodies 5. This avoids undesired incipient melting of the surfaces of the foam plastic bodies 5 taking place in the region of the contact with the upper plastic shell 2. The cooling, in particular by air, in this case takes place in such a limited way that the contact regions that are necessary for the welding of the upper plastic shell 2 to the lower plastic shell 3 are not included in the cooling. A layer of heat-activated adhesive is also provided on the foam plastic body 5 at these contact areas. In principle, a layer of adhesive may also be provided on the inner side of the respective plastic shell.

Figure 8:
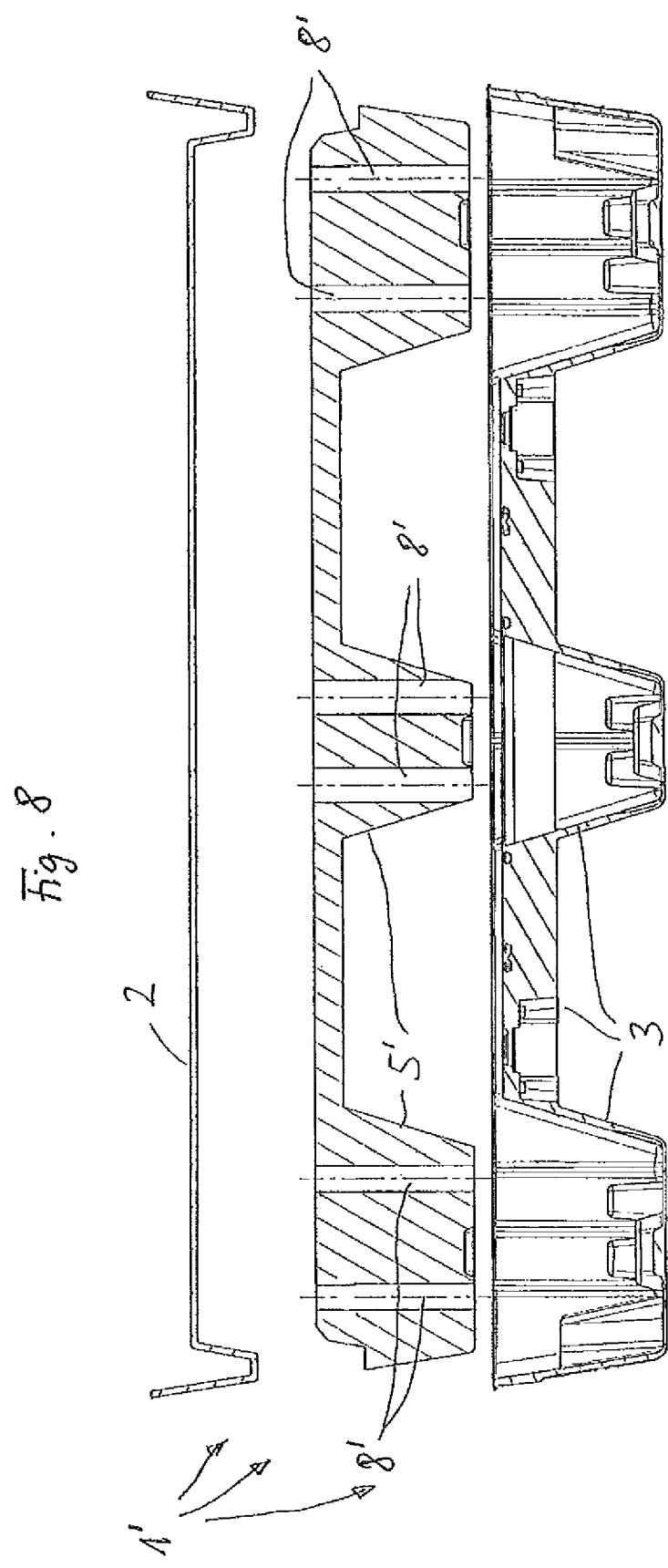
FIG. 8 shows the parts to be joined together of a hollow plastic body in the form of a plastic pallet similar to FIG. 1 in a sectional exploded representation.

The pallet base 1' as shown in FIG. 8 differs from the pallet base 1 as shown in FIGS. 1 and 3 to 7 only in that not a multiplicity but a single foam plastic body 5', which extends over the entire base area of the pallet base 1', is provided as the filler. The foam plastic body 5' also has a small oversize with respect to the facing hollow-space and hollow-chamber regions that the two plastic shells 2, 3 define between them, in order to be put under pressure and welded in the region of its surfaces when the plastic shells 2, 3 are joined together. By analogy with the foam plastic bodies 5, the one-part foam plastic body 5' is provided with clearances 8', which serve for reducing the material of the foam plastic body 5'.

Figure 2:
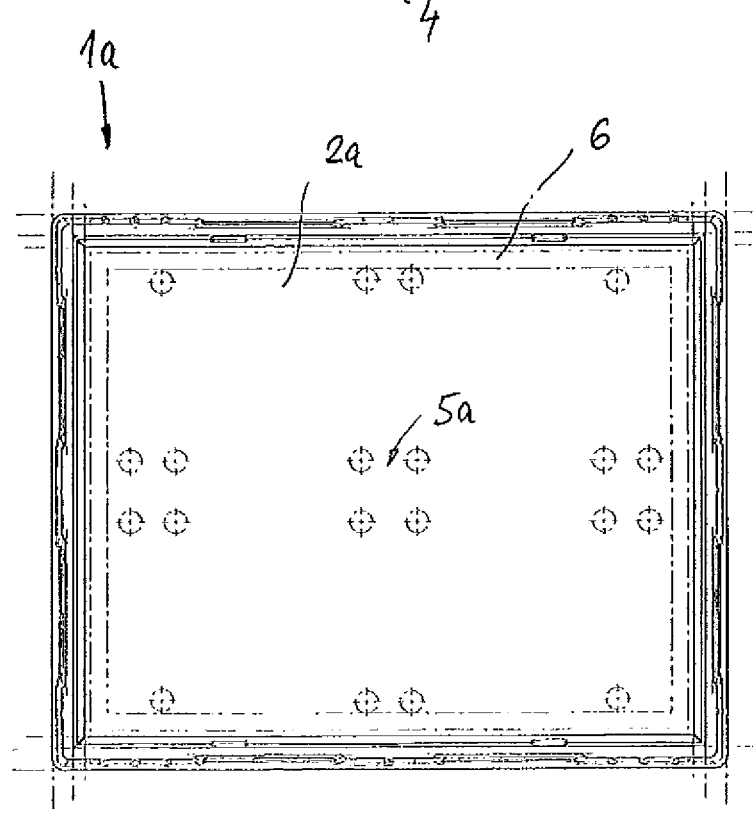
FIG. 2 shows a further plastic pallet similar to FIG. 1, which is provided with a placed-in reinforcing frame, in a plan view.
Figure 3:
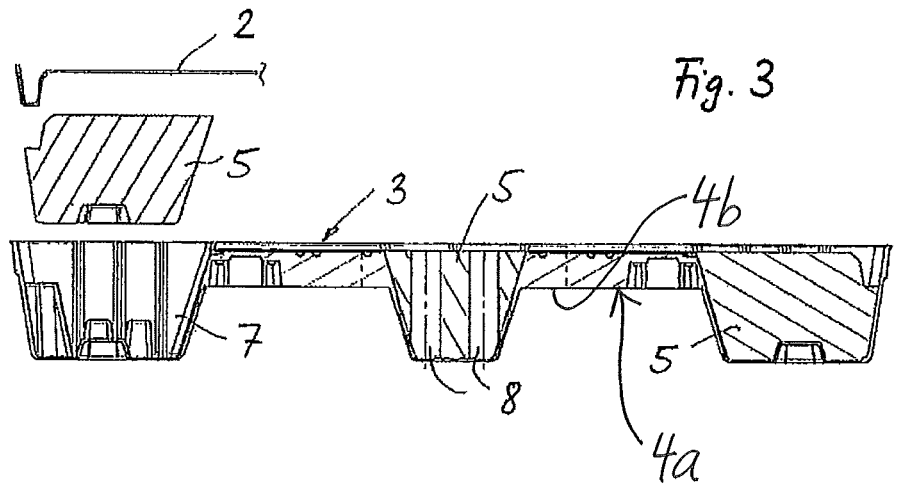
FIG. 3 shows the plastic pallet FIG. 1 in a sectional exploded representation, to explain the method steps for its production.
Figure 4:
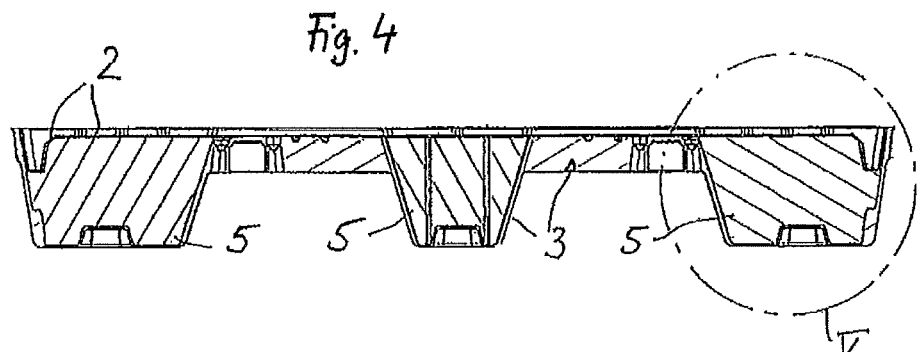
FIG. 4 shows a sectional representation of the plastic pallet as shown in FIGS. 1 and 3.
Figure 5:
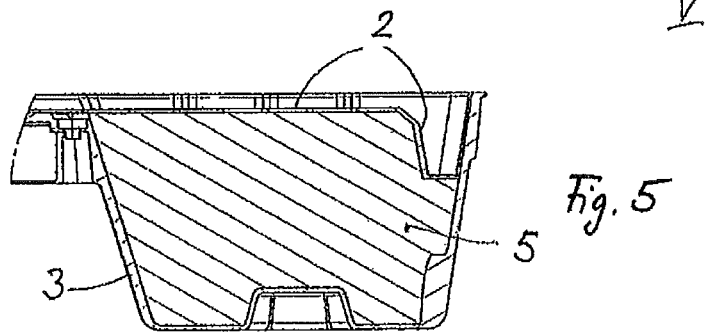
FIG. 5 shows a detail V of the plastic pallet as shown in FIG. 4 in an enlarged representation.
Figure 6:
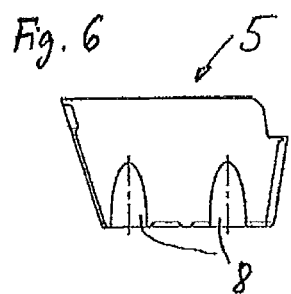
FIG. 6 shows a side view of a foam plastic body, which is integrated in the plastic pallet as shown in FIGS. 1 and 3 to 5.
Figure 7:
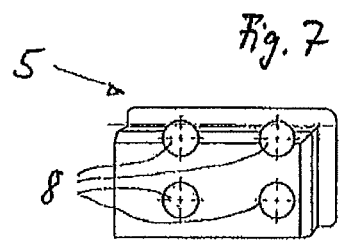
FIG. 7 shows a view of the foam plastic body as shown in FIG. 6 from below.
Figure 9:
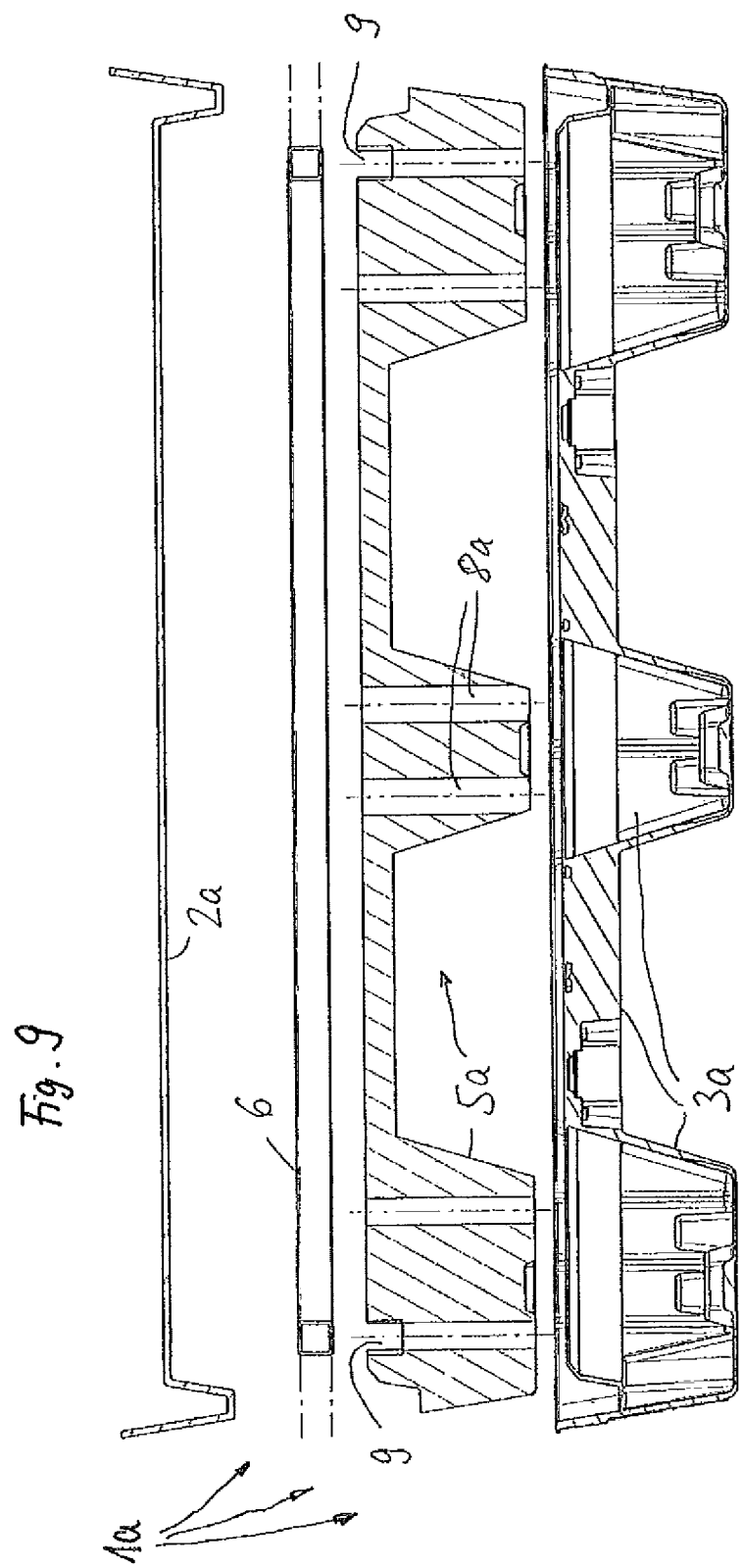
FIG. 9 shows the hollow plastic body in the form of the plastic pallet as shown in FIG. 2 in a sectional exploded representation.

The production of the pallet base 1a as shown in FIGS. 2 and 9 also takes place analogously to the way in which the previously described embodiments are produced. An essential difference from the pallet base 1' as shown in FIG. 8 is that in the one-part foam plastic body 5a, which is designed in a way substantially corresponding to the foam plastic body 5' as shown in FIG. 8, there is also a reinforcing frame 6 of metal, in the present case of steel, inserted in the region of its upper side. For this purpose, the upper side of the foam plastic body 5a is provided with a rectangular and upwardly open receiving groove 9, the dimensions of which have been made to match the reinforcing frame 6 in such a way that the reinforcing frame 6 can be inserted into the receiving groove 9 from above and is accommodated in a clamping manner in the receiving groove 9. In this case, the receiving groove 9 has been made to match a height of the reinforcing frame 6, so that an upper side of the reinforcing frame 6 finishes flush with the upper side of the foam plastic body 5a and, when the upper plastic shell 2a is placed on, comes into contact with it.

Figure 10:
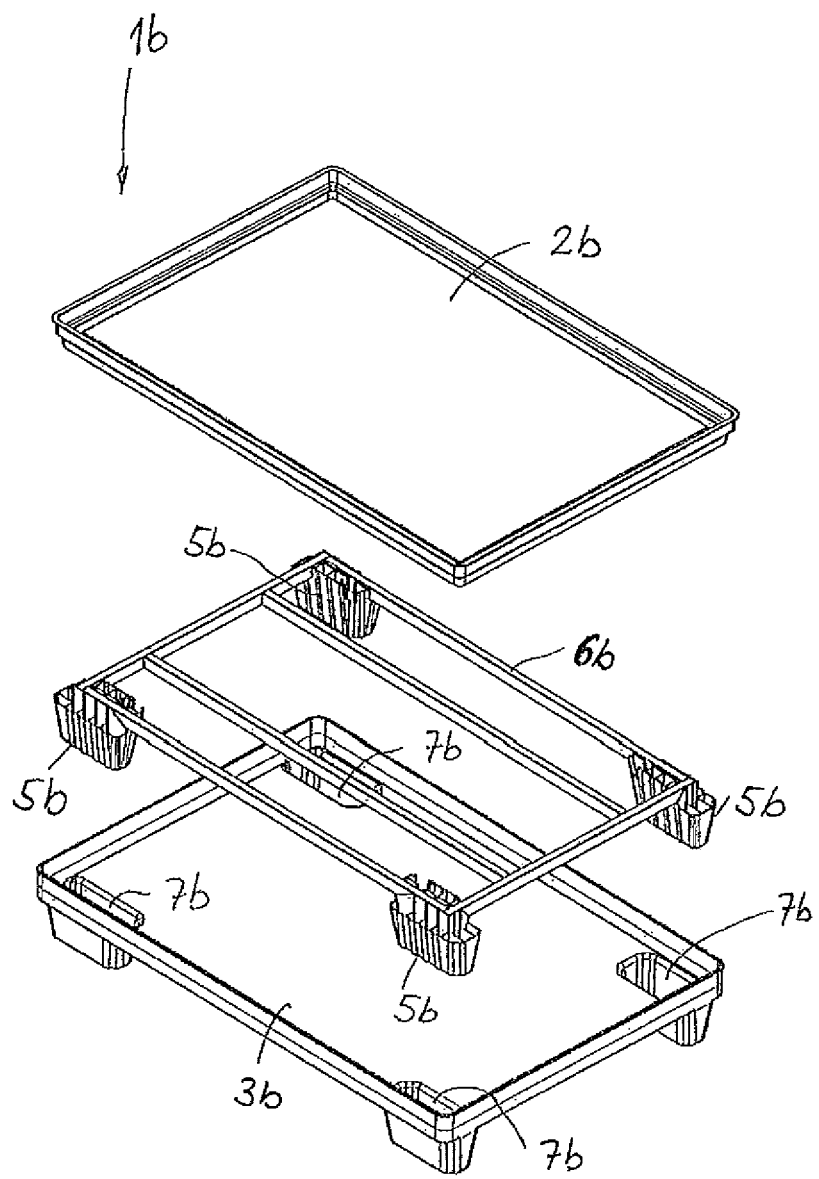
FIG. 10 shows a further embodiment of a plastic pallet according to the invention similar to FIG. 2 in an exploded representation.

A plastic pallet or a pallet base 1b as shown in FIG. 10 corresponds substantially to the previously described embodiments, both with respect to its design and with respect to its production method. To avoid repetition, therefore only the differences from the previously described embodiments are discussed below.

The essential difference of the pallet base 1b as shown in FIG. 10 is that the plastic bodies that are inserted into corresponding hollow spaces 7b in the region of the feet of the pallet base 1b are designed as injection-molded plastic bodies. The hollow spaces 7b, which bring about the formation of the feet of the pallet base 1b, are formed in the lower plastic shell 3b. The outer contours of the injection-molded plastic bodies 5b have been made to match the inner contours of the hollow spaces 7b. The reinforcing frame 6b is already placed into a corresponding mold for the production of the injection-molded plastic bodies 5b, so that the reinforcing frame 6b according to the representation as shown in FIG. 10 is encapsulated by the injection-molded plastic bodies 5b. As a result, the injection-molded plastic bodies 5b and the reinforcing frame 6b form a unit that can be handled as one part. The injection-molding connection between the injection-molded plastic bodies 5b and the reinforcing frame 6b has the effect that particularly good introduction of force into the injection-molded plastic bodies 5b is achieved when loads are exerted on the pallet base 1b. Since these bodies lie directly flush against the walls of the hollow spaces 7b in the inserted and finished state of the pallet base 1b, a corresponding introduction of force from loads exerted on the reinforcing frame 6b is necessarily passed directly into the feet of the pallet base 1b, whereby a particularly high degree of stability of the pallet base 1b is obtained. As a result of the fact that the upper plastic shell 2b is welded around in an airtight and moisturetight manner to the lower plastic shell 3b, the reinforcing frame 6b, which consists of steel or a similarly stable material, is also not subjected to influences of moisture from the surroundings. Rather, it is completely encapsulated between the two plastic shells 2b, 3b.

The invention claimed is:

1. A method for producing a thermoformed plastic pallet comprising the steps of:
   thermoforming a first sheet of plastic into a first plastic shell having a base wall defining a lower terminal surface and a plurality of supporting feet projecting downwardly from and beyond the lower terminal surface in spaced-apart relation with one another to form respective areas for supporting the plastic pallet on a support surface, the first plastic shell having a hollow chamber formed interiorly of each of the supporting feet;
   inserting a dimensionally stable plastic body into each of the hollow chambers, each plastic body having an outer contour matching an inner contour of the corresponding hollow chamber;
   thermoforming a second sheet of plastic into a second plastic shell;
   placing the second plastic shell onto the first plastic shell and the plastic bodies;
   welding a periphery of the second plastic shell to a peripheral region of the first plastic shell; and
   connecting each of the plastic bodies at respective surfaces thereof in a material-bonding manner to corresponding neighboring inner surfaces of the first and second plastic shells.

2. The method according to claim 1, further including forming each plastic body as a foam plastic body or as an injection-molded plastic body.

3. The method according to claim 1, further including forming each plastic body as a foam plastic body, wherein the step of thermoforming the second sheet of plastic includes forming the second plastic shell with a hollow chamber, and forming each foam plastic body so as to be oversized with respect to the corresponding hollow chamber of the first plastic shell and with respect to the hollow chamber of the second plastic shell.

4. The method according to claim 3, further including welding the foam plastic bodies to the inner surfaces of the first and second plastic shells.

5. The method according to claim 4, wherein the step of inserting includes inserting each foam plastic body into the corresponding hollow chamber in a heated state of the first plastic shell.

6. The method according to claim 5, wherein the step of placing includes placing the second plastic shell in a heated state and under pressure onto the first plastic shell and the plastic bodies, and the step of welding includes welding the second plastic shell both peripherally to the first plastic shell and in full area contact to the foam plastic bodies.

7. The method according to claim 1, wherein the step of thermoforming the second sheet of plastic includes forming the second plastic shell with a hollow chamber, and outer dimensions of each plastic body match inner dimensions of the hollow chambers of the first and second plastic shells, the step of connecting further including providing the surfaces of the plastic bodies with a bonding layer of adhesive to form a material-bonding connection between the plastic body and the corresponding neighboring inner surfaces of the first and second plastic shells.

8. The method according to claim 7, wherein at least the hollow chambers of the first plastic shell are cooled before the inserting step.

9. The method according to claim 7, including incipiently melting each plastic body adjacent an outer contour thereof before the inserting step to provide a smooth surface on the plastic body.

10. The method according to claim 1, further including inserting a reinforcing profile arrangement into the first plastic shell before the step of placing.

11. The method according to claim 1, wherein the plastic bodies are interconnected to one another to form a one-piece body, the method further including inserting a reinforcing profile arrangement into the one-piece body before the step of placing.

12. the method according to claim 1, wherein the plastic bodies are interconnected to one another to form a one-piece body, and the step of inserting includes inserting the one-piece body into the first plastic shell such that each plastic body of the one-piece body is located within one of the hollow chambers.

* * * * *